United States Patent
Chiu

(10) Patent No.: US 11,586,435 B2
(45) Date of Patent: Feb. 21, 2023

(54) DISTRIBUTED SYSTEM FOR SOFTWARE VERIFICATION

(71) Applicant: Alpha Networks Inc., Hsinchu (TW)

(72) Inventor: Ying-Yen Chiu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 17/369,998

(22) Filed: Jul. 8, 2021

(65) Prior Publication Data

US 2022/0091843 A1 Mar. 24, 2022

(30) Foreign Application Priority Data

Sep. 22, 2020 (TW) ................. 109132721

(51) Int. Cl.
*G06F 8/71* (2018.01)
*G06F 8/65* (2018.01)
(Continued)

(52) U.S. Cl.
CPC .............. *G06F 8/71* (2013.01); *G06F 8/65* (2013.01); *G06F 9/4401* (2013.01); *H04L 67/34* (2013.01); *H04L 69/16* (2013.01)

(58) Field of Classification Search
CPC . G06F 8/71; G06F 8/65; G06F 9/4401; H04L 67/34; H04L 69/16
(Continued)

(56) References Cited

U.S. PATENT DOCUMENTS 10,986,174 B1 * 4/2021 Sharma ............... H04L 41/0816
11,138,314 B1 * 10/2021 Gettys ................. H04L 9/3239
(Continued)

FOREIGN PATENT DOCUMENTS

DE 102004048665 A1 * 6/2005 ............... G06F 8/65
TW 200923655 6/2009
(Continued)

OTHER PUBLICATIONS

Basin et al., "Failure-aware Runtime Verification of Distributed Systems", 2015, [Online], pp. 590-603, [Retrieved from internet on Dec. 16, 2022], <https://www.research-collection.ethz.ch/bitstream/handle/20.500.11850/112752/3.pdf?sequence=2> (Year: 2015).*
(Continued)

*Primary Examiner* — S. Sough
*Assistant Examiner* — Zengpu Wei
(74) *Attorney, Agent, or Firm* — WPAT, PC

(57) ABSTRACT

A distributed system for software verification includes a plurality of processors, each of which actively executes a verified software to perform a verifying operation of a corresponding target object under no external instruction, wherein the plurality of processors independently perform verifying operations of different target objects; a switch including a plurality of first connection ports electrically coupled to the plurality of processors, respectively, and a second connection port electrically coupled to each of the plurality of first connection ports; and a data collector electrically coupled to the second connection port. An information report is generated and sent to the data collector via the corresponding first connection port and the second connection port in response to the verifying operation.

12 Claims, 4 Drawing Sheets

(51) Int. Cl.
    *H04L 69/16*     (2022.01)
    *H04L 67/00*     (2022.01)
    *G06F 9/4401*     (2018.01)

(58) Field of Classification Search
    USPC .......................................................... 717/171
    See application file for complete search history.

(56) References Cited

U.S. PATENT DOCUMENTS

| | | | |
|---|---|---|---|
| 2005/0010788 A1 | 1/2005 | Craft | |
| 2008/0244532 A1* | 10/2008 | Arcese | G06F 11/3495 |
| | | | 714/E11.208 |
| 2009/0132737 A1 | 5/2009 | Huang et al. | |
| 2009/0307530 A1* | 12/2009 | Tarta | G06F 11/3668 |
| | | | 714/38.14 |
| 2012/0131349 A1 | 5/2012 | Layson et al. | |
| 2012/0284690 A1* | 11/2012 | Blakeley | G06F 8/60 |
| | | | 717/120 |
| 2017/0280290 A1* | 9/2017 | Jones | G06Q 30/0633 |

FOREIGN PATENT DOCUMENTS

| | | | | |
|---|---|---|---|---|
| TW | I315628 | | 10/2009 | |
| TW | 201234208 | | 8/2012 | |
| TW | 201706898 | | 2/2017 | |
| TW | 201810105 | | 3/2018 | |
| WO | WO-2019169757 A1 | * | 9/2019 | .......... G06F 11/3664 |

OTHER PUBLICATIONS

Taiwan Intellectual Property Office, "Issue notification", dated Sep. 30, 2021.

\* cited by examiner

DISTRIBUTED SYSTEM FOR SOFTWARE VERIFICATION

FIELD OF THE INVENTION

The present invention relates to a verification system, particularly to a distributed system for software verification, capable of verifying multiple target objects simultaneously.

BACKGROUND OF THE INVENTION

When the verification of products is performed on the manufacturing side, it is general to verify the functions of products or versions of firmware or software by way of a so-called client/server model. Furthermore, for mass production, it is preferred to verify a plurality of products simultaneously to improve the efficiency of verification. Practical implementation examples can be found in the US Patent Publication No. US 20190392869 and Taiwanese Patent Application No. TW 107114058.

In the client/server model, a plurality of objects is simultaneously inspected or verified by way of an independently main processor, e.g., a personal computer, together with a plurality of command executors, which are controlled by the commands issued by the main processor to perform inspection or verification of the objects corresponding thereto. Accordingly, the command executors cannot execute inspecting or verifying operations until receiving relevant instruction codes from the main processor. It is thus critical for the prior art to precisely allocate the control procedures of the main processor to assure that a stream channel between a command executor and the main processor would not be affected by another streaming channel between another command executor and the main processor.

Furthermore, the prior art might suffer from a change in the amount of the command executors. Whenever the amount of the command executors is changed, the control procedures need to be modified. The ability to adapt to changes is unsatisfactory.

SUMMARY OF THE INVENTION

Therefore, the present invention provides a distributed system for software verification, which can adaptively verify multiple target objects at the same time without complicated control procedures.

In an aspect of the present invention, a distributed system for software verification includes a plurality of processors, each of which actively executes a verified software to perform a verifying operation of a corresponding target object under no external instruction, wherein the plurality of processors independently perform verifying operations of different target objects; a switch including a plurality of first connection ports electrically coupled to the plurality of processors, respectively, and a second connection port electrically coupled to each of the plurality of first connection ports; and a data collector electrically coupled to the second connection port. An information report is generated and sent to the data collector via the corresponding first connection port and the second connection port in response to the verifying operation.

BRIEF DESCRIPTION OF THE DRAWINGS

The invention will become more readily apparent to those ordinarily skilled in the art after reviewing the following detailed description and accompanying drawings, wherein.

DETAILED DESCRIPTION OF PREFERRED EMBODIMENTS

The invention will now be described more specifically with reference to the following embodiments. It is to be noted that the following descriptions of preferred embodiments of this invention are presented herein for illustration and description only. It is not intended to be exhaustive or to limit the invention to the precise form disclosed.

Figure 1:
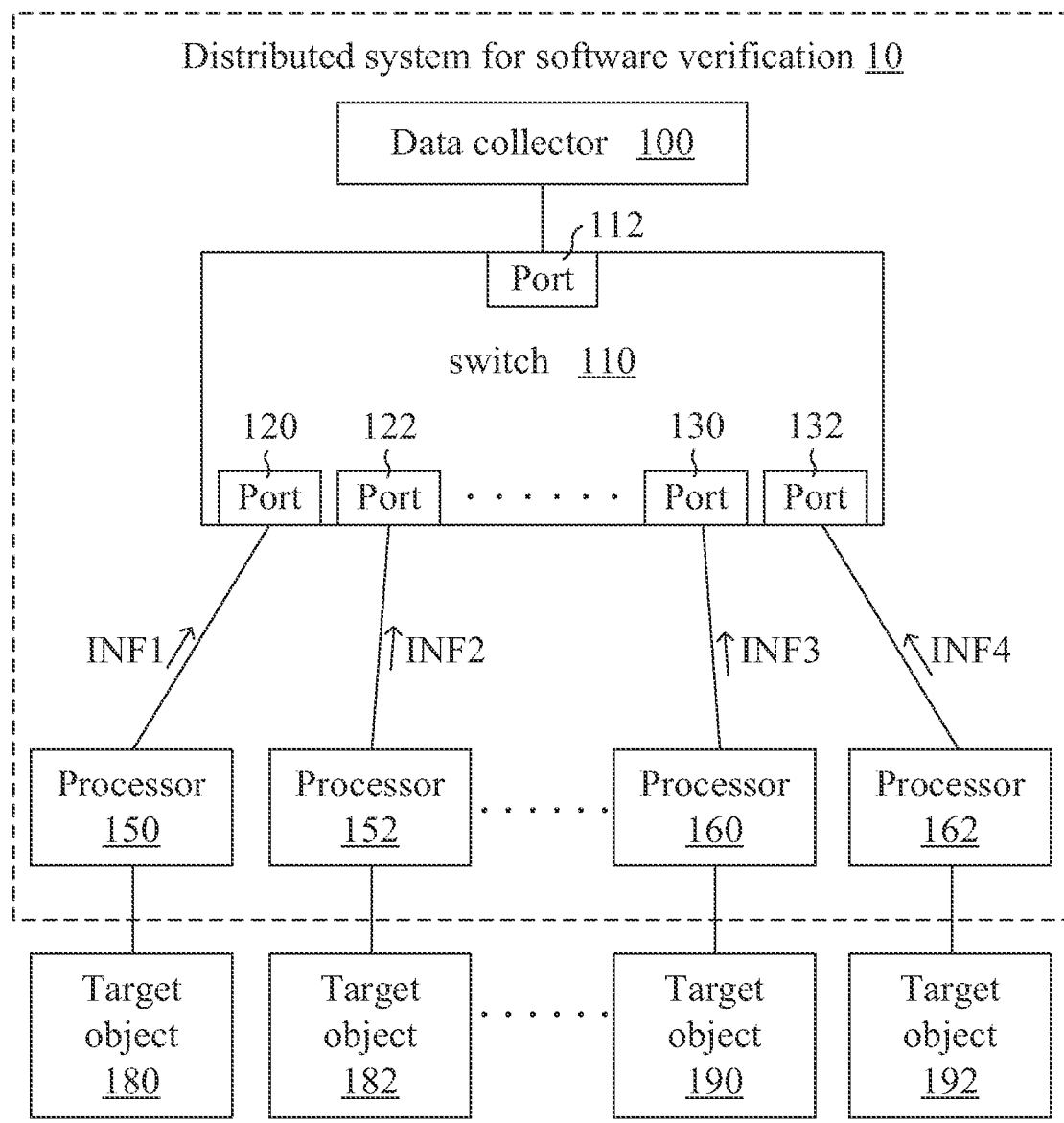
FIG. 1 is a schematic block diagram illustrating a distributed system for software verification according to an embodiment of the present invention.

Please refer to FIG. 1. A distributed system for software verification 10 according to an embodiment of the present invention includes a data collector 100, a switch 110 and a plurality of processors 150, 152, 160 and 162. The switch 110 includes a plurality of first connecting ports 120, 122, 130 and 132, electrically coupled to the processors 150, 152, 160 and 162, respectively, and a second connecting port 112, electrically coupled to the data collector 100. The second collecting port 112 is further electrically coupled to each of the first connecting ports 120, 122, 130 and 132. The processor 150 generates an information report INF1 in response to the verification of a target object 180, and sends the information report INF1 to the data collector 100 via the first connecting port 120 and the second connecting port 112. Likewise, the processor 152 generates an information report INF2 in response to the verification of a target object 182, and transmits the information report INF2 to the data collector 100 via the second connecting port 122 and the first connecting port 112. The processor 160 generates an information report INF3 in response to the verification of a target object 190, and transmits the information report INF3 to the data collector 100 via the second connecting port 130 and the first connecting port 112. The processor 162 generates an information report INF4 in response to the verification of a target object 192, and transmits the information report INF4 to the data collector 100 via the second connecting port 132 and the first connecting port 112. On the other hand, the data collector 100 can transmit data to any of the processors 150, 152, 160 and 162 via the second connecting port 112 and the corresponding one of the connecting ports 120, 122, 130 and 132.

Desirably, the same communication protocol is used for transmitting data between the data collector 100 and each of the processors 150, 152, 160 and 162. For example, an architecture based on Transmission Control Protocol (TCP)/Internet Protocol (IP) can be used for establishing a channel for transmitting report data. The TCP/IP protocol architecture is advantageous because the data collector 100 can be used as a control center and automatically assigns corresponding IP addresses of the data collector 100 and the processors 150, 152, 160 and 162. Therefore, a new channel can be readily established to add a new processor to the distributed system for software verification 10. An existing channel can be independently removed from the distributed system for software verification 10 without affecting other channels remaining in the distributed system for software verification 10.

Furthermore, to eliminate the interference, i.e., race hazard or race condition, among the processors 150, 152, 160 and 162, channels of communication between the processors 150, 152, 160 and 162 and the data collector 100 are individual and independent. For example, the processors 150, 152, 160 and 162 are desirably implemented with independent processors, which can verify target objects without any external instruction. Please refer to FIG. 2. A functional block diagram of a processor 20 adapted to be used in the distributed system for software verification 10 is schematically illustrated. The processor 20 includes an executing unit 210. The executing unit 210 executes a verified software 200 stored therein to verify a target object 24. The verifying operation, for example, includes determining whether the target object is verifiable, updating a firmware in connection with the target object, and determining whether the firmware has been successfully updated. The verifying operation generates an information report INF, and the executing unit 210 sends the information report INF outwards to the data collector 100 shown in FIG. 1.

Figure 2:
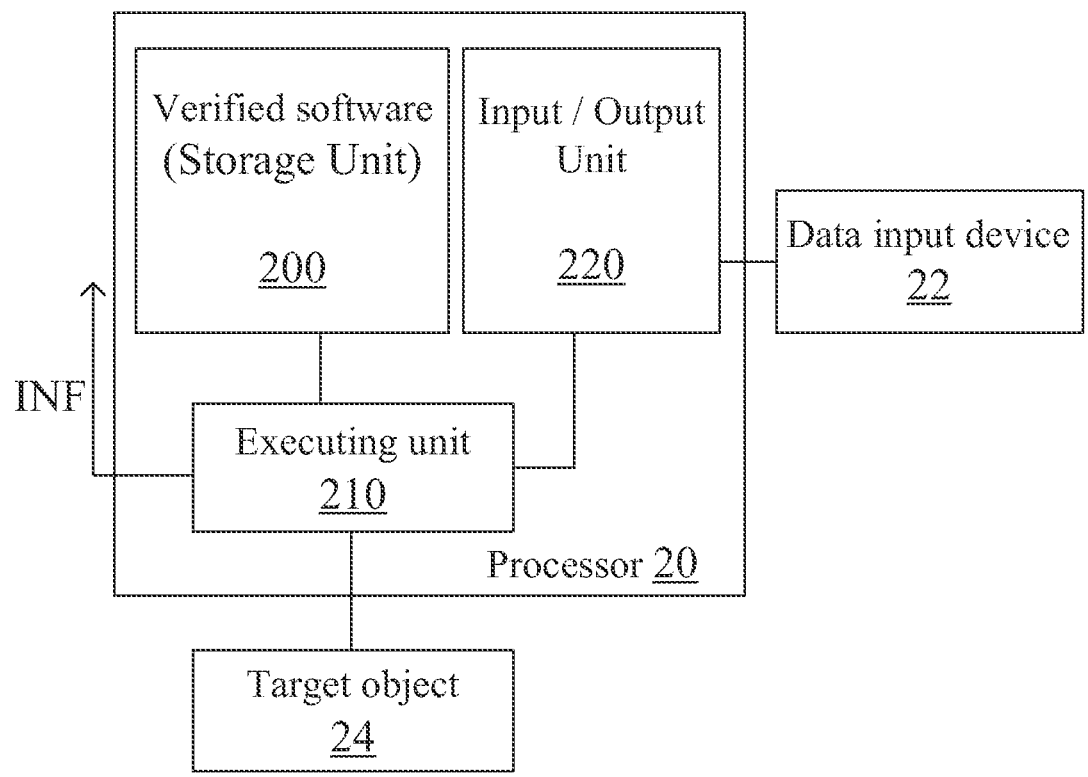
FIG. 2 is a schematic functional block diagram illustrating a processor adapted to be used in a distributed system for software verification according to an embodiment of the present invention.

In this embodiment, the processor 20 is implemented with a single-chip computer such as Raspberry Pi. Functions of the single-chip computer can be expanded by way of its Input/Output (I/O) unit. For example, as shown in FIG. 2, the processor 20 includes an I/O unit 220 electrically coupled to the executing unit 210. Via the I/O unit 220, the executing unit 210 can obtain required data from a data input device 22 electrically coupled to the I/O unit 220 for flexibly adjusting verification parameters. The I/O unit 220, for example, may include a storing interface adapted to be used in a single-chip computer and a Universal Serial Bus (USB) interface. Meanwhile, the data input device 22 may include a memory card installed in the storing interface and a camera module installed in the USB interface. The camera module, for example, may be a one-dimensional bar-code reader, a two-dimensional bar-code reader, or an image recognizer. In a case that the camera module is a two-dimensional QR Code (Quick Response Code) reader, the QR Code reader 22 can be used to read a label of the target object 24, and then the executing unit 210 can obtain the information of the target object 24 from the QR Code reader 22 via the I/O unit 220. The information, for example, may include a type of the object, a version of the object and/or an item to be verified. After the information is obtained, a corresponding verified software can be retrieved from the memory card (storage unit) to serve as the verified software 200. In another case that the camera module is an image or character recognizer, the executing unit 210 may further execute an artificial intelligence system to parse the contents of the captured image or characters. Therefore, by cooperating with different external devices connected thereto, the processor 20 can perform various verifying operations depending on practical requirements. Furthermore, since the distributed system for software verification, according to the present invention, may include a plurality of processors, each of which can perform various verifying operations, the distributed system functions for software verification are thus expandable and adaptable to practical applications.

In another embodiment, an output interface (not shown) of the processor 20 can be used to install lighting means, e.g., LED, whose colors and/or flashing patterns can be controlled to vary with the status of the verifying operations. Accordingly, a user may readily realize the status of the verifying operations and take necessary actions.

Please refer back to FIG. 1. After the information report INF1, INF2, INF3 and INF4 are generated by the processors 150, 152, 160 and 162 and transmitted to the data collector 100, the data collector 100 records, analyzes and/or calculates the information report INF1, INF2, INF3 and INF4 and provides the processed results for further research and/or modification of system designs. The contents of the information report INF1, INF2, INF3 and INF4, for example, may include verification-executability of the target object, former and up-to-date versions of a corresponding software/firmware, and updating status of the software/firmware.

Hereinafter, the present invention is to be described in more detail with reference to an example. It is to be noted that the example is for illustration only and can be modified to comply with practical requirements. For example, an order of the processing procedures may be adjusted, if necessary, and any other suitable industrial standard may be adopted depending on practical requirements.

Figure 3A:
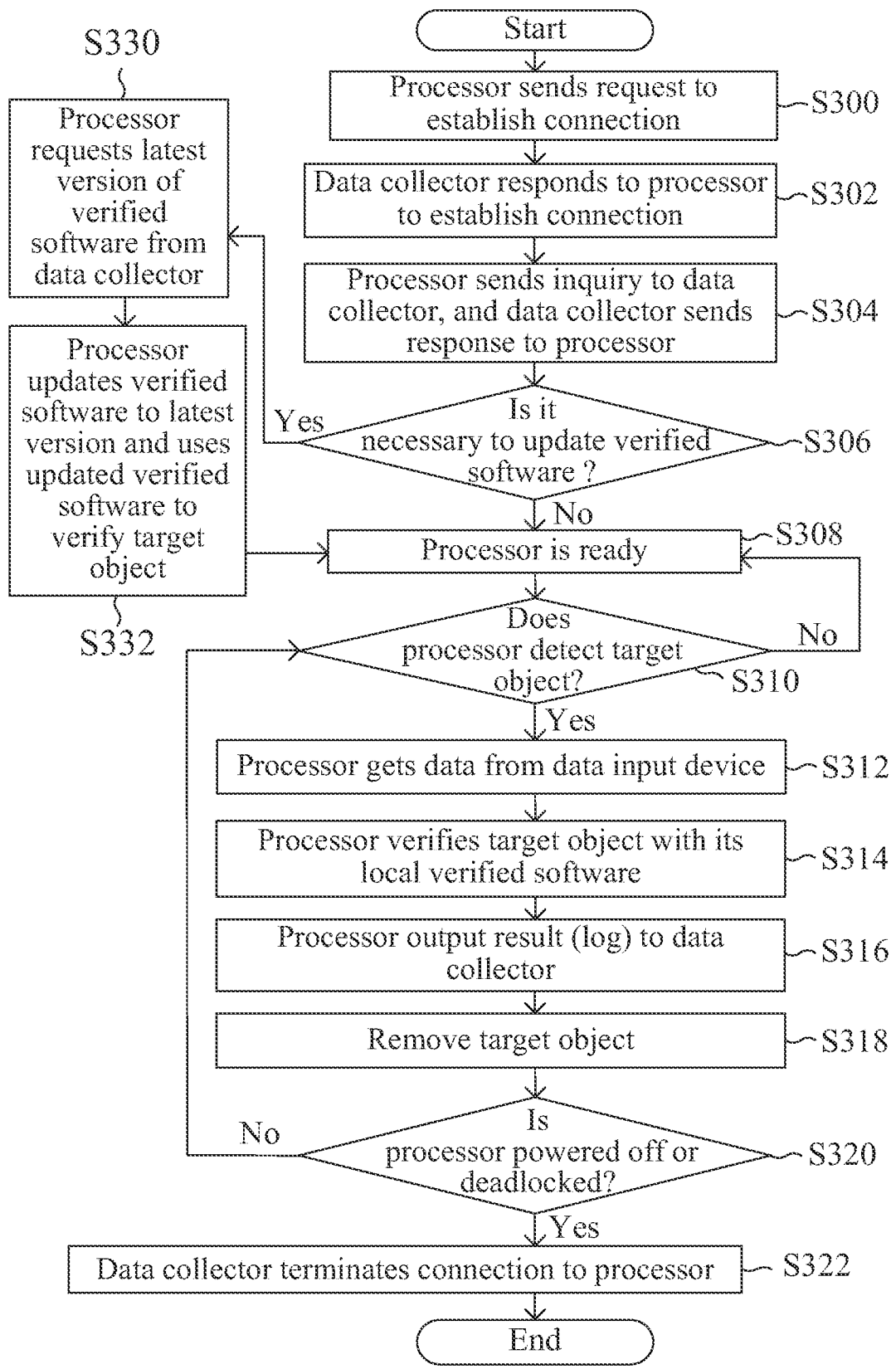
FIGS. 3A and 3B are flowcharts schematically illustrating two examples of working processes of a distributed system for software verification according to the present invention.

Please refer to a flowchart of FIG. 3A. A verifying operation of the distributed system for software verification according to an embodiment of the present invention is exemplified. In this example, the verifying operation performed with the processor 150 operating with the TCP/IP protocol is illustrated, and the other processors of the distributed system for software verification may perform similar operations with or without adaptive modifications. The processor 150 issues a request to establish a connection to the outside upon booting (step S300). Since the processor 150 has not established a connection with the data collector 100 at this time, the processor 150 may send a connecting request in a broadcast manner. After receiving the connecting request sent by the processor 150 by broadcasting, the data collector 100 automatically assigns an IP address to the processor 150 so that the TCP/IP connection between the data collector 100 and the processor 150 (step S302) can be established accordingly. Implementing automatic assignment of the IP address and establishing the TCP/IP connection can refer to descriptions of relevant protocols, which will not be redundantly described herein.

Once the TCP/IP connection between the data collector 100 and the processor 150 is established, the processor 150 can inquire the data collector 100, by way of this TCP/IP connection (Step S304) to realize whether the verified software is necessary to be updated or not (Step S306). If the data collector 100 sends a response information indicating that the verified software must be updated, the processor 150 will update the verified software. If the data collector 100 responds to the processor 150 that the verified software is not necessary to be updated, the processor 150 skips from updating the verified software and enters a state ready to verify the target object 180 (Step S308). On the contrary, if the data collector 100 sends another response information indicating the verified software that must be updated, the processor 150 follows the instruction from the data collector 100 to request the latest version of the verified software from the data collector 100 to update the verified software (Step S330), and the latest version of the verified software replaces for the former one to be used by the processor 150 (Step S332). Afterwards, the processor 150 uses the latest version of the verified software to verify the target object 180. Preferably, one or more procedures for securing data transmission and/or enhancing the system's operational efficiency may be added into the flow of Steps S330 and S332. For example, confirming an access right of the processor 150 to obtain the latest version of the verified software from the data collector 100 may be executed to secure data. In addition, to avoid the system from being stuck in an endless loop due to network connection issues, a step of issuing a warning signal and/or automatically inspecting the connection when a count of data transmission exceeds a preset threshold may be executed.

Following Step 308, i.e., the processor 150 is ready to perform a verifying operation of the target object 180 with the proper version of the verified software, the processor 150 repetitively checks a connecting state thereof to see if any target object is connected (Step S310). Once a specified target object is located, the processor 150 tentatively reads data from a data input device if there is one coupled thereto (Step S312). After the data has been completely read, or if no data is available to be read, or if no data input device is found, the processor 150 will execute the current version of the verified software to perform the verifying operation of the target object 180 (Step S314). The verifying result is then incorporated into the information report INF1 by the processor 150 and sent to the data collector 100 by way of the previously established TCP/IP connecting (Step S316). It is to be noted that the information report INF1, as well as INF2, INF3 and/or INF4, include but are not limited to the above-mentioned verifying result. In other embodiments, the information report may further include the processor successfully connect to the target object, the verifying operation of the target object starts, the verifying operation of the target object ends, and a parameter showing whether the verifying operation of the target object conducts successfully, and/or a record of the verifying operation of the target object, etc.

The processor 150 controls an equipment, e.g., a mechanical arm, to remove the object 180 after providing the verifying result to the data collector 100 (Step S318). Subsequently, whether the processor 150 is in a condition to continue verification is determined. For example, whether the processor 150 is powered off or deadlocked is determined (Step S320). The determination in Step S320 can be based on a preset rule or an input from external means. If the processor 150 is still in a ready condition, e.g., constantly sending packets to the data collector 100, the flow goes back to Step 310 to repeat necessary procedures. On the other hand, if the processor 150 is powered off or deadlocked, the data collector 100 terminates the TCP/IP connecting therebetween (Step S322).

Figure 3B:
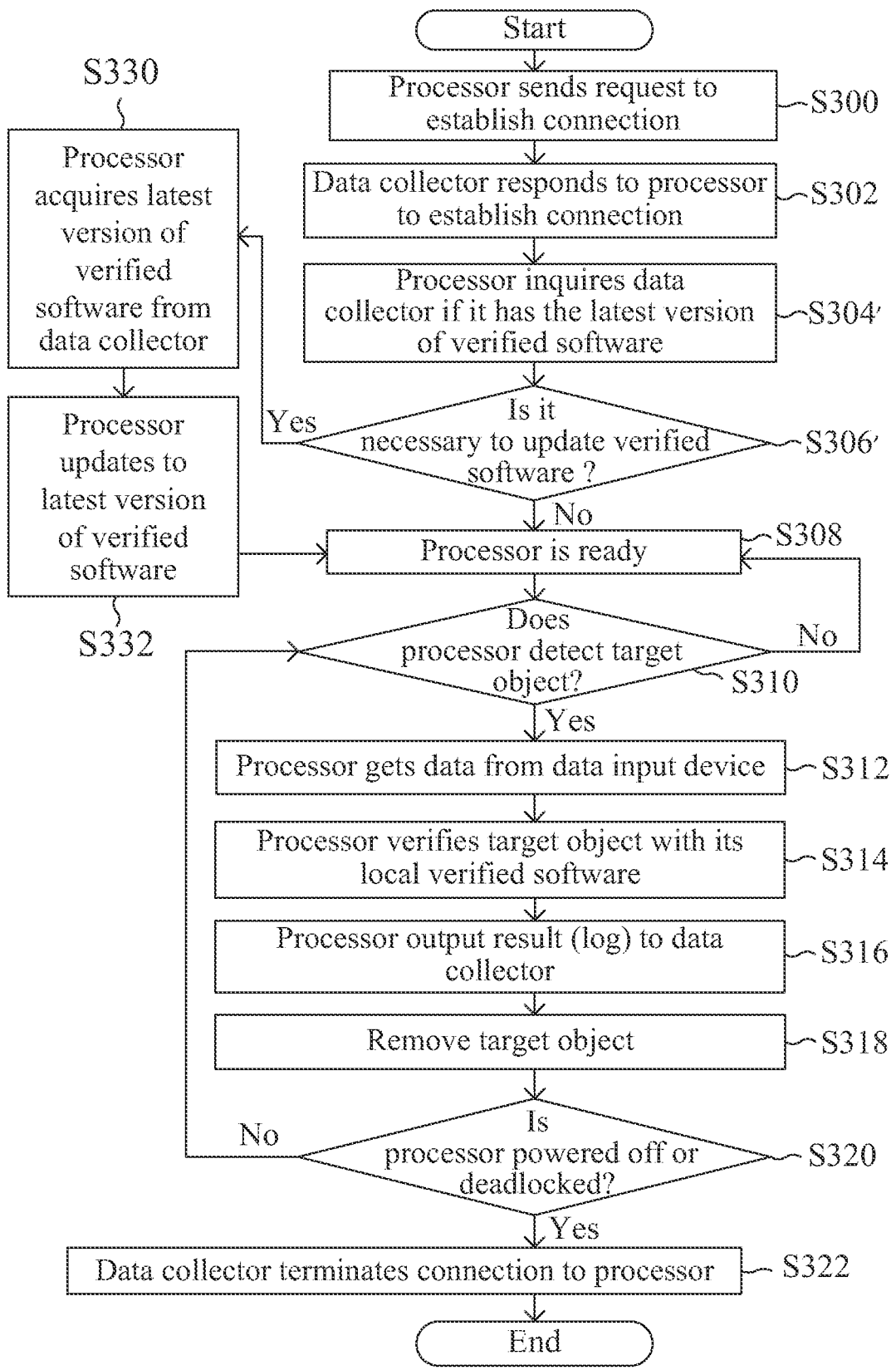

In Step S306 of the above embodiment of verifying operation, a rule for determining whether the verified software must be updated or not is preset by the data collector 100 upon boosting or at an appropriate time point before Step S300. When the processor 150 sends the inquiry to the data collector 100 in Step S304, the data collector 100 will respond to the processor 150 about the version of the verified software according to the preset rule. The rule can be set according to practical requirements. For example, it can be set that the verified software is mandatorily updated whenever there is a new version available. FIG. 3B exemplifies such a verification operation, in which in Step S304', the processor 150 inquires the data collector 100 whether there is the latest version of the verified software available (Step S306'). If positive, the flow proceeds to Step S330. On the contrary, if the verified software has been the latest version, the flow proceeds to Step S308. In another example, it can be set that the version of the verified software varies with the target object to be verified. In other words, different versions of the verified software can be used for different target objects, and the processor 150 will obtain the information, e.g., specific contents of data, from the data collector 100 in Step S304 of FIG. 3A.

In summary, the distributed system for software verification provided by the present invention uses multiple independently operable processors to execute a verified software to verify a target object. Therefore, the design of the verified software does not need to take complex competition conditions of processors. Moreover, the distributed system for software verification provided by the present invention only needs to change the number of processors directly or replace the verified software directly in the corresponding processors to adapt to the situation where the number of verifications or target objects changes. Therefore, according to the present invention, the distributed system for software verification has a system architecture that is easy to design and adjust, so it can save laboring and time required to set up the verification system.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A distributed system for software verification, comprising:
    a plurality of processors, each of which actively executes a verified software to perform a verifying operation of a corresponding target object under no external instruction, wherein the plurality of processors independently perform verifying operations of different target objects;
    a switch including a plurality of first connection ports electrically coupled to the plurality of processors, respectively, and a second connection port electrically coupled to each of the plurality of first connection ports; and
    a data collector electrically coupled to the second connection port,
    wherein in response to the verifying operation, an information report is generated and sent to the data collector via the corresponding first connection port and the second connection port.

2. The system according to claim 1, further comprising a data input device, which is electrically coupled to a specified one of the plurality of processors and provides an input data relating to an information of the corresponding target object for the specified processor.

3. The system according to claim 2, wherein the data input device includes a camera module or a photodetector.

4. The system according to claim 3, wherein the camera module or the photodetector is selected from a group consisting of a one-dimensional bar-code reader, a two-dimensional bar-code reader, an image/character recognizer, and combinations thereof.

5. The system according to claim 4, wherein the two-dimensional bar-code reader is QR Code (Quick Response Code) reader.

6. The system according to claim 1, wherein a channel for transmitting the information report between a specified one of the plurality of processors and the data collector is established by way of a TCP/IP protocol.

7. The system according to claim 6, wherein the data collector automatically assigns an IP address to the specified processor to establish the channel.

8. The system according to claim 1, wherein a specified one of the plurality of processors is connected to the data collector before performing the verifying operation and determines whether the verified software of the specified processor is necessary to be updated by checking specific contents of data from the data collector.

9. The system according to claim 8, wherein the specified processor obtains an up-to-date version of the verified software from the data collector to perform the verifying operation if it is necessary for the specified processor to use the up-to-date version of the verified software to execute verification, but the specified processor does not have the up-to-date version of the verified software.

10. The system according to claim 8, wherein a rule for determining whether the verified software of the specified processor is necessary to be updated is preset by the data collector while booting or at a time point before the connection between the specified processor and the data connector is established.

11. The system according to claim 10, wherein according to the rule, the verified software is mandatorily updated whenever there is a new version available.

12. The system according to claim 10, wherein according to the rule, a version of the verified software varies with the target object to be verified.

* * * * *